Figure 3:
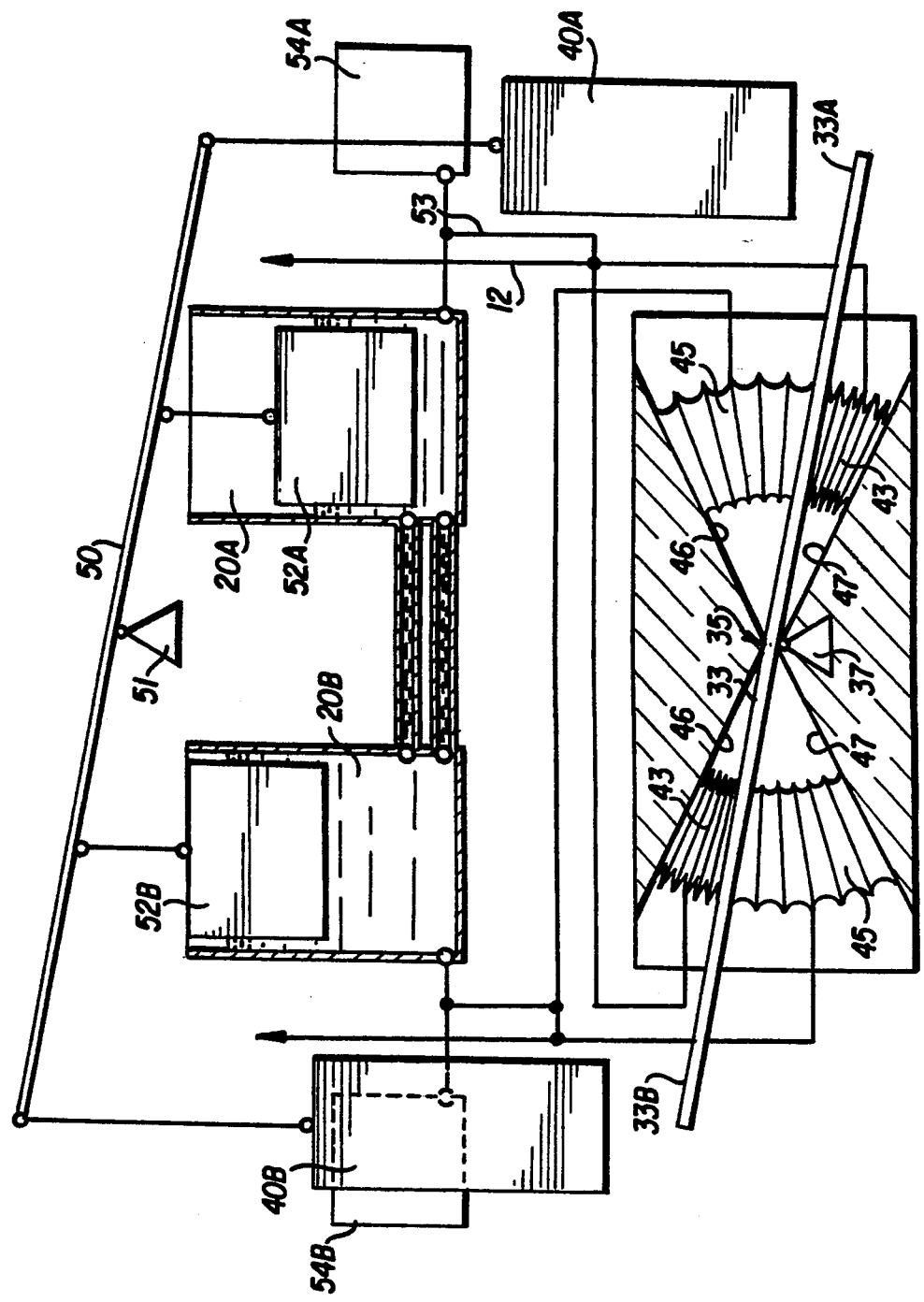

United States Patent [19]
Rosenberg

[11] Patent Number: 5,355,674
[45] Date of Patent: Oct. 18, 1994

[54] INSTALLATION FOR GENERATING UTILIZABLE ENERGY FROM POTENTIAL ENERGY

[76] Inventor: Baruch Rosenberg, 4 Hadekalim St., Ramat-Hadar Hod-Hasharon, Israel

[21] Appl. No.: 27,155
[22] PCT Filed: Sep. 20, 1991
[86] PCT No.: PCT/EP91/01802
§ 371 Date: Mar. 19, 1993
§ 102(e) Date: Mar. 19, 1993
[87] PCT Pub. No.: WO92/05366
PCT Pub. Date: Apr. 2, 1992

[30] Foreign Application Priority Data
Sep. 20, 1990 [DE] Fed. Rep. of Germany ... 9013326[U]

[51] Int. Cl.$^5$ .................. F16D 31/00; H02P 9/04
[52] U.S. Cl. .................. 60/325; 60/398; 417/229; 290/52; 290/1 R
[58] Field of Search .......... 417/229; 60/325, 398, 60/532; 290/52, 1 R

[56] References Cited
U.S. PATENT DOCUMENTS

| 159,660 | 2/1875 | Faivre . | |
|---|---|---|---|
| 1,833,979 | 12/1931 | Swindle | 417/229 |
| 2,020,361 | 11/1935 | Johnston . | |
| 3,803,422 | 4/1974 | Krickler | 417/229 X |
| 4,180,976 | 1/1980 | Bunn | 60/325 |
| 4,212,598 | 7/1980 | Roche et al. . | |
| 4,238,687 | 12/1980 | Martinez . | |
| 4,239,975 | 12/1980 | Chiappetti . | |
| 4,339,920 | 7/1982 | LeVan . | |
| 4,409,489 | 10/1983 | Hayes . | |
| 4,427,015 | 3/1984 | Rosenblum . | |
| 4,739,179 | 4/1988 | Stites . | |
| 4,980,572 | 12/1990 | Sen | 290/1 R |
| 5,157,922 | 10/1992 | Rosenberg . | |

FOREIGN PATENT DOCUMENTS

| 2941079 | 4/1981 | Fed. Rep. of Germany . | |
|---|---|---|---|
| 0113069 | 9/1981 | Japan | 417/229 |
| 0146079 | 11/1981 | Japan | 417/229 |
| 0079880 | 4/1986 | Japan | 417/229 |
| WO8807135 | 7/1990 | World Int. Prop. O. . | |

Primary Examiner—Edward K. Look
Assistant Examiner—Hoang Nguyen
Attorney, Agent, or Firm—Wigman, Cohen, Leitner & Myers

[57] ABSTRACT

An installation for generating utilizable energy from potential energy is disclosed. The invention comprises a first swivel plate pivotally mounted within a roadway, a second swivel plate spaced from the roadway, transmission means operatively connecting the first and second swivel plates, and fluid fille containers adapted to be compressed.

12 Claims, 3 Drawing Sheets

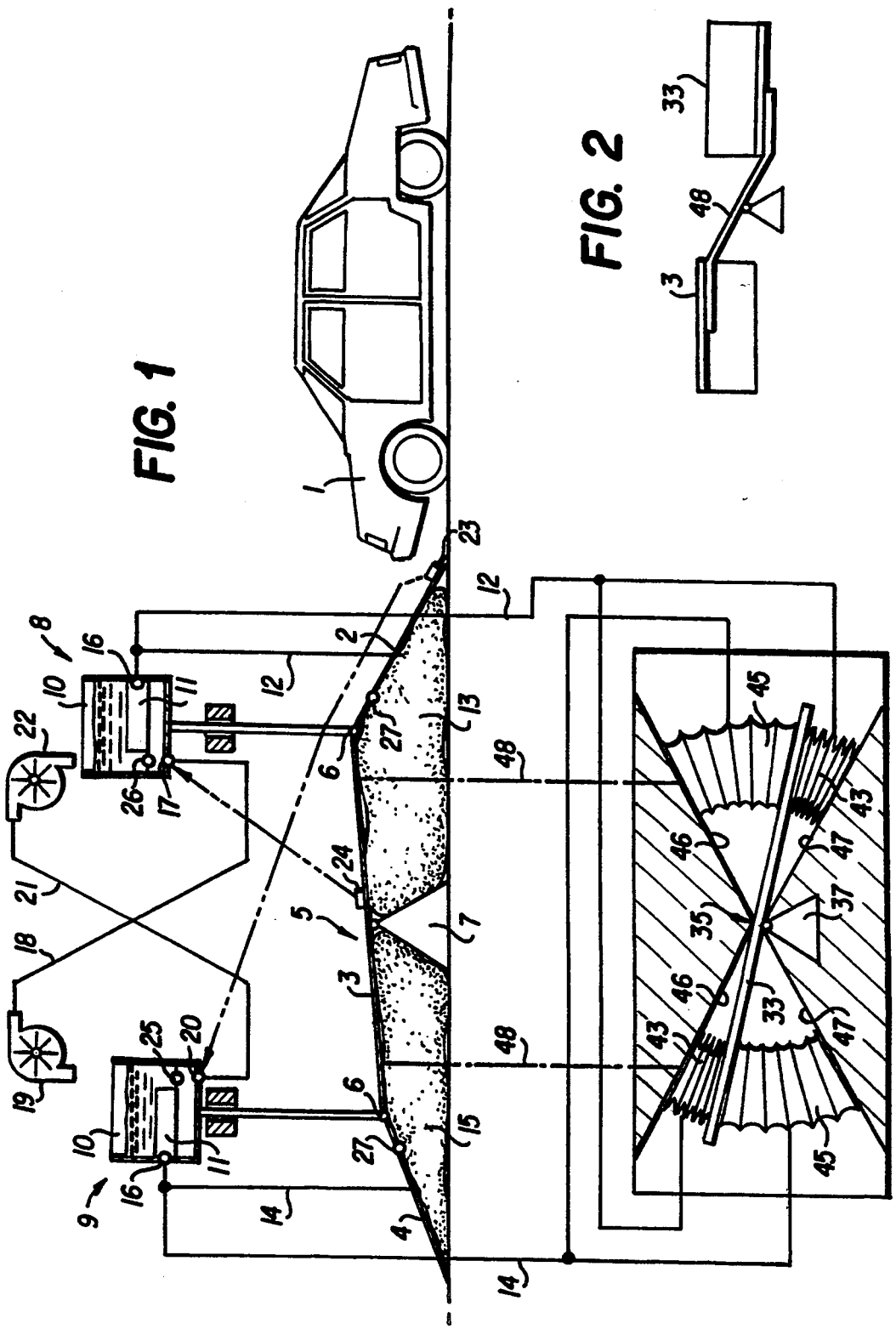

INSTALLATION FOR GENERATING UTILIZABLE ENERGY FROM POTENTIAL ENERGY

This invention relates to an installation for generating utilizable energy from potential energy of slowly driving motor vehicles of the street traffic, wherein the machinery comprises at least one rigid swivel plate to be overtravelled by the motor vehicles and beared on a bearing block, the plate being lowerable under the weight of a motor vehicle, wherein a fluid being able to flow is urged out of flexible containers and directed into a pressure equalizing container being connected with a turbine or a hydraulic motor.

Such an installation for generating utilizable energy from potential energy of motor vehicles of street traffic is already known from the U.S. Pat. No. 4,339,920. According to this patent a plurality of flexible containers, which are filled with an incompressible fluid, are squeezed together, and subsequently the fluid is directed, may be after passing a flexible and hence extendable container, to a hydraulic motor for generating utilizable energy. The containers being compressible by the weight of a motor vehicle are disposed in small chambers which are inserted within the traffic lane, whereby the covers of these cheers can be urged by the weight of a motor vehicle into a position underneath the surface of the traffic lane. Thereby the tire of the motor vehicle is hit very hard like in case of driving through potholes.

Furthermore, an installation for generating utilizable energy from potential energy of motor vehicles is known from DE-OS 35 42 031. According to this specification, flexible containers filled with water are compressed by means of rigid swivel plates and the urged out water is fed for generating energy into a turbine.

It has shown to be a disadvantage of this installation, that there have to be taken special measures for driving back the urged out water into the flexible containers and thereby to move back the swivel plates into their original position. Furthermore, it has shown to be disadvantageous to urge an incompressible fluid out of the flexible containers, because in this case the energy cannot be accumulated without taking additional measures in form of a fluid under pressure and hence a turbine cannot be driven in an optional moment.

In order to render possible to accumulate energy in form of a fluid under pressure and furthermore to utilize the force of gravity of the water flowing out of the turbine, additionally for generating energy, it was further proposed (WO 90/08259) that the fluid being urged out of the flexible containers into the water-bearing pressure equalizing container is air which presses water through the turbine and through the hydraulic motor, respectively, and a storage container for water is positioned subsequently behind the turbine of the hydraulic motor, respectively, and the storage container is pivotably supported on the swivel plate on both sides of the bearing block, whereby the storage container assists in lowering the swivel plate and hence assists in driving out the air, wherein filling the storage containers is controlled by motor vehicleactuated signal transmitters which open and close valves, in such a way that the suitable storage container is exactly filled in the right moment so that it actually assists in lowering the plate caused by the motor vehicle.

An object of the invention is to further develop an installation of the present kind in such a way that the efficiency of the installation is further increased, even if the swivel mechanism has a small construction height with only a small swivel stroke of the swivel plate.

In meeting this object the invention is an installation for generating utilizable energy from potential energy of slowly driving motor vehicles of the street traffic, comprising a rigid first swivel plate being built in a traffic lane and being centrally pivoted, said first swivel plate being supported on flexible first air containers to be compressed by the swiveling of the first swivel plate and being coupled by means of a power transmission with a rigid second swivel plate being located laterally of the first swivel plate outside the traffic lane and being centrally supported, additional flexible air containers being supported at said second swivel plate to be compressed by the swiveling of said second swivel plate, said air containers being connected-through compressed-air lines to at least one water-bearing pressure equalizing container connected through a water line with a hydraulic motor, especially with a turbine, to press water through the turbine and through the hydraulic motor, respectively, said hydraulic motor and turbine, respectively, being connected with its outlet to water storage containers connectable to the pressure equalizing container and pivotably supported by one of the swivel plates whereby the storage container assist in lowering the swivel plate and hence assist in compressing the air containers, wherein filling the storage containers is controlled by motor vehicle-actuated signal transmitters which open and close valves, in such a way, that the suitable storage container is exactly filled at the right moment so that it actually assists in lowering the plate caused by the motor vehicle.

Due to arranging, according to the invention, a second swivel plate, which is coupled with the first swivel plate for transmission of motion and which can be arranged laterally of the traffic lane without limitation of its construction height and by which additional air in additional flexible air containers is compressed and pumped into the pressure equilizing container to expel the water into the hydraulic motor and the turbine, respectively, which is driven thereby, a more complete utilization of the potential energy of the motor vehicles passing over the first swivel plate can be reached even if the swiveling strokes of the first swivel plate are small.

Herein, the power transmission can be constructed as an step-up transmission so that the swiveling stroke of the second swivel plate is larger than that of the first swivel plate. Said power transmission is preferably constructed as a lever transmission, though other suitable power transmissions could be used.

The storage containers can be supported at both sides of the swivel axis of the first swivel plate or of the second swivel plate. From the water storage containers the water is redelivered into the pressure equalizing container.

According to a preferred embodiment, the additional second water bearing pressure equalizing containers and additional second water storage containers are supported on the additional second swivel plate, these containers having the same construction as the containers supported on the first swivel plate helping to urge air out of said second flexible air containers.

According to another preferred embodiment of the invention the installation further comprises a right end portion and a left end portion of said second swivel plate; a right heavy weight and a left heavy weight being in operational connection with the right and left end portions and a swivel rod pivoted at its middle portion on a bearing block; a right and a left water container; and a right and a left swimmer inside the right and the left water containers, respectively, wherein the swivel rod is connected at its right and left side with the right and left swimmer and the right and left weight, respectively, the additional flexible air containers being connected to the right and left water containers urging water out of the right water container into the left water container or vice versa, forcing the right swimmer to to move up and the left swimmer to move down or vice versa, thereby swiveling the swivel rod and lowering the right weight onto the right end portion of the swivel plate, or vice versa onto the left end portion, for helping to swivel said second swivel plate and therefore helping to urge air out of said additional flexible air containers.

According to another preferred embodiment the installation comprises reserve air pressure containers, providing additional air for urging water out of the right water container into the left water container or vice versa, the reserve air container being opened by a valve responsive to an electronic signal according to the position of the car.

Due to the small construction height of the first swivel plate, the first swivel plate can especially be built into the traffic lane as a bumpiness causing threshold for slowing down the traffic. On the other hand, it is possible to build in the first swivel plate in or on the traffic lane in front of a traffic light for motor vehicles or in or on a sidewalk in front of a pelican crossing.

In the following the invention will be described more detailedly with the help of preferred embodiments and with reference to the accompanying drawings.

In the drawings shows:

FIG. 1 a construction scheme of a first embodiment of the invention, and

FIG. 2 schematically a transmission of motion between two swivel plates.

FIG. 3 a construction scheme of a second embodiment of the invention.

Figure 4:
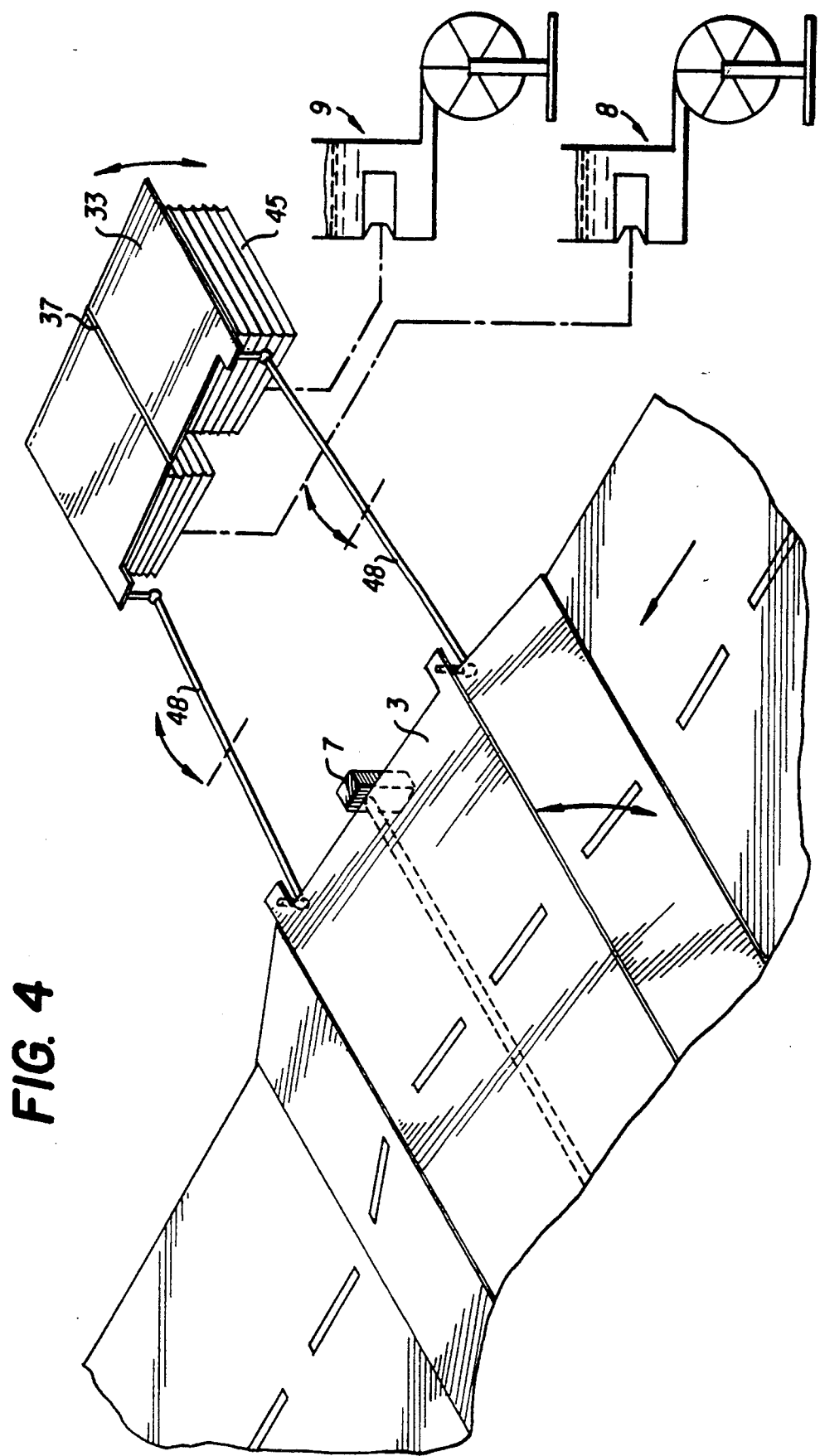

FIG. 4 is an environmental view of my invention.

As shown in FIG. 1, a motor vehicle moves from the right to the left towards the swivel plate unit 5 consisting of swivel plates 2, 3 and 4.

The middle swivel plate 3, being said first swivel plate referred to herein, is preferably near its middle portion swiveling on bearing block 7 around an axis being horizontal and transverse with respect to the traffic lane.

Near or directly at the hinges 6 a first storage container 8 and a second storage container 9 for water- and compressed air is fixed. Both comprise two parts, i.e. an upper container 10 being open to atmosphere and a closed pressure equalizing container 11, partly filled with water and partly filled with compressed air.

A first pressure resistant hose 12 is lead out of the part filled with air of the pressure equalizing container 11 of the first storage container B and is directed to a first flexible air container 13 disposed underneath the swivel plates 2 and 3.

Analogically, a second pressure resistant hose 14 is directed from the part filled with air of the pressure equalizing container of the second storage container 9 towards a second flexible air container 15 disposed underneath the swivel plates 3 and 4.

Both hoses are open towards the flexible air containers, respectively, while they are provided with a nonreturn valve 16 towards the pressure equalizing container 11. Into the part of the first storage container 8 which is filled with water a hose 18 is lead which is provided with a nonreturn valve 17 at the side of the container and the other side of which leads to a first turbine 19. Analogically, another hose 21 is lead to the second storage container 9 and provided with a nonreturn valve 20 at the side of the storage container, while its other end leads to a second turbine 22.

The nonreturn valve 20 of the second storage container 9 can be opened by signal transmitter 23, while nonreturn valve 17 of the first storage container 8 can be opened by a signal of signal transmitter 24. When the approaching vehicle touches signal transmitter 23, nonreturn valve 20 is opened and water is urged by means of compressed air within pressure equalizing container 11 through the turbine 22. From the outlet of turbine 22 water flows towards part 10 of the first storage container 8 being open to atmosphere. At the same moment vehicle 1 drives on swivel plate 2, wherein the plate 3 is linked to it and pivoted on bearing block 7 and turns around an axis being horizontal and transverse with respect to the traffic lane. As a result of this turning movement the flexible air containers 13 filled with air and disposed under plates 2 and 3 are squeezed together urging out compressed air through the first hose 12 into the pressure equalizing container of the first storage container 8. Thereby nonreturn valve 16 opens by itself.

Because in the meantime a sufficient amount of water has passed turbine 22 into the first storage container 8, the force of gravity of the first storage container 8 which is supported near hinge 6 connecting plate 2 and plate 3 assist in squeezing together the first flexible air container 13, whereby it assists in drawing up a storage of compressed air within pressure equalizing container 11 of storage container 8. When the vehicle reaches bearing block 7 being disposed near the second signal transmitter 24, nonreturn valve 17 of the first storage container 8 is opened and water is urged by the compressed air drawn up before within pressure equalizing container 11 of the first storage container 8 through hose 18 into turbine 19, the outlet of which terminates in part 10 of the second storage container 9 open to atmosphere, whereby the force of gravity of the container 9 assist in forcing plate 3 to turn in the other direction, whereby the storage of compressed air within the second storage container 9 which had been used up before is rebuilt, after nonreturn valve 25 had opened under the pressure of the water within part 10 of the second storage container 9 and hence pressure equalizing container 11 had been refilled with water. By means of the pressure being rebuild within pressure equalizing container 11 the nonreturn valve 25 is closed again.

When the vehicle leaves plate 4 and hence the whole installation, the storage of compressed air within the pressure equalizing container 11 of the first storage container 8 is used up again and no water is left within the pressure equalizing container. This causes that nonreturn valve 26 of the first storage container 8 opens under the pressure of the water within part 10 of the storage container being open to atmosphere and discharges into the pressure equalizing container filling it with water again. That means that the final state, i.e. the state after the vehicle has left the installation, is the same as the original state, i.e. the state before the vehicle was driven onto the installation.

The plate 3 returns thereby by itself into a certain predetermined position. Thereby the nonreturn valves 27 of the flexible air containers 13 or 15, respectively, open and render possible that fresh air can pass into the air containers.

That means that in the original and the final states the part 10 of the first storage container 8 being open to atmosphere is empty, the pressure equalizing container 11 is partly filled with water and the pressure within the pressure equalizing container is the same as the atmospheric pressure, while the part 10 of the second storage container 9 being open to atmosphere is filled with water as well as the pressure equalizing container 11 is partly filled with water and partly filled with compressed air.

Hence, if a following vehicle drives onto the installation, the whole procedure can take place again, whereby the turbines 19 and 22 are both driven for a short period of time and may, for instance, generate electrical power by means of a dynamo being coupled with the turbines.

Because the supplying of energy by the vehicles takes place discontinuously, i.e. temporarily not constant, it is convenient to provide the turbines 19, 22 with a flywheel which has the function to store kinetic energy for bridging over the period of time when no vehicle drives onto the installation.

The installation according to the invention further comprises at least one second swivel plate arrangement 35, which is shown in FIG. 1 only by reason of figuring below the first swivel plate arrangement 5 and which actually is located laterally of the first swivel plate arrangement outside of the traffic lane. The second swivel plate arrangement 35 comprises a second swivel plate 33, which also centrally is rotatingly supported on a second bearing block 37. Above and below the swivel plate at both sides of the bearing block 37 and spaced therefrom additional flexible air containers 43 and 45 are provided which at the one hand are attached to the swivel plate 33 and at the other hand are attached to stationary supports 46 and 47. The flexible air containers are also connected to the pressure equalizing containers 11 through pressure resistant flexible hoses 42, 44 and nonreturn valves 16 or additional nonreturn valves. The swivel plate 33 is coupled with the swivel plate 3 of swivel plate arrangement 5 by means of power transmissions 48, which are only schematically shown by dash and dot lines, in such a way that the swivel motions of the swivel plate 3 are transmitted to the swivel plate 33 so that the latter is also rotated up and down and therefore the air containers 43 and 45 are alternately compressed for compressing air and pumping the compressed air into the respective pressure equalizing container 11 and extended again for sucking-in environmental air through additional nonreturn valves not shown.

FIG. 2 schematically shows such a power transmission 48 in form of a two-arm swivel lever, being stationarily supported and engaging with its lever arm the swivel plate 3 and the swivel plate 33, respectively. The lever arms of swivel lever can be differently long in order to provide for a larger swivel stroke of swivel plate 33 than of swivel plate 3.

Instead of supporting the water storage containers 10 and the pressure equalizing container 11 integrated therein on first swivel plate 3, it is possible to support them on second swivel plate 33. Further, it is possible to provide for such containers 10, 11 both on swivel plate 3 and on swivel plate 33. 33.

FIG. 3 shows a further embodiment of the invention wherein an additional right weight 40A and an additional left weight 40B help to swivel the additional swivel plate 33. For this reason, the weights 40A and 40B are connected to a swivel rod 50 pivoted on a bearing block 51. The swivel rod 51 is swiveled by a right swimmer 52A floating within a right water container 20A and a left swimmer 52B floating within a left water container 20B, thereby moving said first weight down onto the right end portion of the second swivel plate 33 and the left weight up from said left end portion of the second swivel plate 33 and helping to urge air out of the second flexible containers 43 and 45. The mechanism of swiveling the swivel rod 51 is as follows: Besides a pipe or lose 12 leading to the turbine 19 the second flexible container 45 is connected by a further hose 53 to a right water container 20A. When air is urged out of the flexible container 45 as described with reference to FIG. 1, it is pressed via hose 53 into the right water container 20A urging water within this container 20A via a further hose into the left water container 20B. As a result, the swimmer 52A within the right water container 20A is lowered and the swimmer 52B within the left water container 20B is moved up. This causes, that the right weight 40A is lowered onto the right end portion 33A of the second swivel plate 33. In this state, the right weight 40A helps to urge air out of the flexible containers 43 and 45. In the other case, i.e. when the left portion 33B of the second swivel plate 33 is lowered, the right swimmer 52A is moved up and the left swimmer 52B is moved doll in the above mentioned way, causing the opposite reaction and helping again to urge air out the flexible containers 43 and 45. By means of non return valves it is realized, that the air and water is not released before it should be released.

According to further improvements of the embodiment according to FIG. 3, the air in the flexible containers 43 and 45 is precompressed to realize a higher pressure. Moreover, right and left reserve air pressure containers 54A, 54B are connected to the right and left water containers 20A and 20B, opening towards these water containers 20A, 20B by means of a valve responsive on a electronic signal due to the position of the car. Additional air pressure may also be applied by a further swivel plate urging out air and being actuated by a car.

What I claim is:

1. An installation for generating utilizable energy from the potential energy of moving motor vehicles, on a road comprising a first, swivel plate pivotably mounted in said road, said first swivel plate being supported on flexible first air containers to be compressed by the swiveling of the first swivel plate and being coupled by means of a power transmission to a rigid second swivel plate being located laterally of the first swivel plate and being centrally supported, flexible second air containers supported at said second swivel plate to be compressed by the swiveling of said second swivel plate, said first and second air containers being connected through compressed-air lines to at lest one water-bearing pressure equalizing container connected through a water line with a hydraulic motor to press water through the hydraulic motor, said hydraulic motor being connected with its outlet to water storage containers adapted to being connected to the pressure equalizing container and pivotally supported by at least one of the swivel plates whereby the storage container assists in lowering the swivel plate and hence assists in compressing the air containers, wherein filling the storage containers is controlled by motor vehicleactuated signal transmitters which open and close valves in such a way, that the suitable energy container is exactly filled at the right moment so that it assists in lowering the plate caused by the motor vehicle.

2. The installation according to claim 1, wherein said power transmission is constructed as an step-up transmission so that the swiveling stroke of the second swivel plate is larger than that of the first swivel plate.

3. The installation according to claim 1, wherein said power transmission is constructed as a lever transmission.

4. The installation according to claim 1, wherein additional second water bearing pressure equalizing containers and additional second water storage containers are supported on the additional second swivel plate, these containers having the same construction as the containers, supported on the first swivel plate helping to urge air out of said second flexible air containers.

5. The installation according to claim 1, further comprising a right end portion and a left end portion of said second swivel plate; a right heavy weight and a left heavy weight being in operational connection with the right and left end portions and a swivel rod (50) pivoted at it's middle portion on a bearing block; a right and a left water container; and a right and a left swimmer inside the right and left water containers, respectively, wherein the swivel rod is connected at it's right and left side with the right and left swimmer and the right and left weight, respectively, the additional flexible air containers being connected to the right and left water containers (20A, 20B) urging water out of the right water container into the left water container or vice versa, forcing the right swimmer to move up and the left swimmer to move down or vice versa, thereby swiveling the swivel rod (50) and lowering the right weight (40A) onto the right end portion (33A) of the swivel plate (33), or vice versa onto the left end portion, for helping to swivel said second swivel plate and therefore helping to urge air out of said additional flexible air containers.

6. The installation according to claim 5, further comprising reserve air pressure containers, providing additional air for urging water out of the right water container (20A) into the left water container (20B) or vice versa, the reserve air containers (54A, 54B) being opened by a valve responsive to an electronic signal according to the position of the car.

7. The installation according to claim 1, wherein the first swivel plate is built into a traffic lane as a bumpiness causing threshold in a traffic calmed zone.

8. The installation according to claim 1, wherein the first swivel plate is built into the traffic lane in front of a traffic light.

9. The installation according to claim 1, wherein the first swivel plate is built into a sidewalk in front of a pelican crossing traffic light.

10. A device for generating energy from potential energy of a moving vehicle, comprising:
a first bearing support;
a first assembly supported by said bearing support such that said first plate assembly is lowered by the force of gravity of a vehicle travelling over said first plate assembly;
a second bearing support;
a second plate assembly supported by said second bearing support, and positioned remote from said first plate assembly;
transmission means operationally connecting said first and second plate assemblies;
a first pressure equalizing reservoir adapted to retain water and air;
a flexible container assembly containing air and in fluid communication with said reservoir, said flexible container being positioned such that the lowering of said second plate assembly compresses and forces air from said container and to said pressure equalizing reservoir so as to achieve a pressure increase in said reservoir;
a first duct in fluid communication with said reservoir;
a first valve member positioned in line with said first reservoir and said first duct;
a first motor positioned in line with said first duct and downstream from said first reservoir;
a first water storage container supported by said second plate assembly;
valve actuating means for opening said valve such that the increased pressure in said first reservoir is released through the forcing of water from said first reservoir, through said first duct, and past said first motor in a motor driving fashion; and
first directing means for directing water that has excited said first reservoir into said first water storage container, such that the water level increases when the vehicle travels over said plate assembly so as to assist the vehicle in lowering the plate assembly.

11. A device as recited in claim 10, wherein said first motor is a turbine.

12. A device as recited in claim 10, further comprising a second pressure equalizing reservoir, a second duct, a second motor, a second valve member, or second directing means, and a second water storage container, operatively connected to said first plate assembly.

* * * * *